(12) United States Patent
Kim et al.

(10) Patent No.: US 9,865,866 B2
(45) Date of Patent: Jan. 9, 2018

(54) METHOD FOR COATING CARBON ON LITHIUM TITANIUM OXIDE-BASED ANODE ACTIVE MATERIAL NANOPARTICLES AND CARBON-COATED LITHIUM TITANIUM OXIDE-BASED ANODE ACTIVE MATERIAL NANOPARTICLES PRODUCED BY THE METHOD

(71) Applicant: KOREA INSTITUTE OF SCIENCE AND TECHNOLOGY, Seoul (KR)

(72) Inventors: Jaehoon Kim, Seoul (KR); Jong Min Park, Seoul (KR); Kyung Yoon Chung, Seoul (KR); Agung Nugroho, Seoul (KR); Byung Won Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 934 days.

(21) Appl. No.: 13/662,994

(22) Filed: Oct. 29, 2012

(65) Prior Publication Data
US 2013/0302690 A1    Nov. 14, 2013

(30) Foreign Application Priority Data

May 8, 2012  (KR) .................. 10-2012-0048704

(51) Int. Cl.
*H01M 4/36*  (2006.01)
*H01M 4/485*  (2010.01)
(Continued)

(52) U.S. Cl.
CPC ........... *H01M 4/366* (2013.01); *H01M 4/485* (2013.01); *H01M 4/587* (2013.01); *H01M 4/625* (2013.01);
(Continued)

(58) Field of Classification Search
CPC ...... H01M 4/485; H01M 4/587; H01M 4/625; H01M 4/366; H01M 4/1391; H01M 10/052
See application file for complete search history.

(56) References Cited

U.S. PATENT DOCUMENTS

| | | | |
|---|---|---|---|
| 7,022,311 B1 * | 4/2006 | Ohkuma | A61K 9/145 424/45 |
| 2011/0217593 A1 * | 9/2011 | Dollinger | B82Y 30/00 429/231.1 |
| 2011/0236299 A1 * | 9/2011 | Gao | H01M 4/131 423/598 |

OTHER PUBLICATIONS

Agung Nugroho, Su Jin Kim, Kyung Yoon Chung, Byung-Won Cho, Youn-Woo Lee and Jaehoon Kim"Facile synthesis of nanosized Li4Ti5O12 in supercritical water" (available online Apr. 8, 2011.*

(Continued)

*Primary Examiner* — Jonathan G Leong
*Assistant Examiner* — Seenam Agbetiafan
(74) *Attorney, Agent, or Firm* — Ladas & Parry LLP; Loren K. Thompson

(57) ABSTRACT

Disclosed is a method for carbon coating on lithium titanium oxide-based anode active material nanoparticles. The method includes (a) introducing a lithium precursor solution, a titanium precursor solution and a surface modifier solution into a reactor, and reacting the solutions under supercritical fluid conditions to prepare a solution including nanoparticles of an anode active material represented by $Li_4Ti_5O_{12}$, (b) separating the anode active material nanoparticles from the reaction solution, and (c) calcining the anode active material nanoparticles to uniformly coat the surface of the nanoparticles with carbon. Further disclosed are carbon-coated lithium titanium oxide-based anode active material nanoparticles produced by the method. In the anode active material nanoparticles, lithium ions are transferred (Continued)

rapidly. In addition, the uniform carbon coating ensures high electrical conductivity, allowing the anode active material nanoparticles to have excellent electrochemical properties.

19 Claims, 3 Drawing Sheets

(51) Int. Cl.
*H01M 4/587* (2010.01)
*H01M 4/62* (2006.01)
H01M 4/1391 (2010.01)
H01M 10/052 (2010.01)

(52) U.S. Cl.
CPC ........ *H01M 4/1391* (2013.01); *H01M 10/052* (2013.01)

(56) References Cited

OTHER PUBLICATIONS

Nakayama et al., "Preparation of TiO2 nanoparticles surface-modified by both carboxylic acid and amine: Dispersibility and stabilization in organic solvents", (available online Dec. 4, 2007).*

Agung Nugroho, Su Jin Kim, Kyung Yoon Chung, Byung-Won Cho, Youn-Woo Lee and Jaehoon Kim"Facile synthesis of nanosized Li4Ti5O12 in supercritical water" (available online Apr. 8, 2011).*

* cited by examiner

METHOD FOR COATING CARBON ON LITHIUM TITANIUM OXIDE-BASED ANODE ACTIVE MATERIAL NANOPARTICLES AND CARBON-COATED LITHIUM TITANIUM OXIDE-BASED ANODE ACTIVE MATERIAL NANOPARTICLES PRODUCED BY THE METHOD

CROSS-REFERENCE TO RELATED APPLICATIONS

This application claims priority under 35 U.S.C. §119 to Korean Patent Application No. 10-2012-0048704 filed on May 8, 2012 in the Korean Intellectual Property Office, the disclosure of which is incorporated herein by reference in its entirety.

BACKGROUND OF THE INVENTION

1. Field of the Invention

The present invention relates to a method for carbon coating on lithium titanium oxide-based anode active material nanoparticles by calcining anode active material nanoparticles surface modified with an organic material to uniformly coat carbon on the nanoparticles, achieving high electrical conductivity leading to excellent electrochemical properties and allowing rapid transfer of lithium ions. The present invention also relates to carbon-coated lithium titanium oxide-based anode active material nanoparticles produced by the method.

2. Description of the Related Art

Lithium secondary batteries are widely used at present as power sources of information-related devices and communication devices, such as portable computers, mobile phones and cameras, due to their high energy density.

In response to recent efforts to reduce the dependence of petroleum and to reduce the emission of greenhouse gases, there has been an increasingly fierce competition to develop plug-in hybrid electric vehicles (PHEVs) and electric vehicles (EVs) using lithium secondary batteries as energy sources.

Furthermore, considerable research efforts have concentrated on the development of secondary batteries with the expectation that there will be a dramatically increasing demand for medium- and large-sized secondary batteries in various application fields, including robots, backup powers, medical devices, motor-driven tools and uninterruptible power supplies (UPSs).

Particularly, electric vehicles, motor-driven tools and uninterruptible power supplies require electrical charge or discharge at high rate within a short time. As power sources to meet this requirement, lithium secondary batteries are considered suitable due to their suitability for high-rate charge/discharge and good stability.

Various kinds of carbonaceous anode active materials capable of intercalating/deintercalating lithium ions are widely used at present as anode materials for lithium secondary batteries. Such carbonaceous anode active materials include artificial graphite, natural graphite, hard carbon and soft carbon.

Carbonaceous anode active materials have an operating voltage similar to that of lithium metal, are very structurally stable, and can reversibly intercalate/deintercalate lithium ions for a long time, implying excellent cycle characteristics. However, batteries using carbonaceous anode active materials have the problem of low energy density per unit volume due to low density of the carbonaceous materials. Further, since carbonaceous anode active materials have an oxidation/reduction potential by about 0.1 V lower than the oxidation/reduction potential of Li/Li$^+$, organic electrolytes tend to decompose on the surface of carbon. In addition, the carbonaceous materials react with lithium to form solid electrolyte interface (SEI) films. The SEI films cover the surface of the carbonaceous anode active materials, causing deterioration of charge/discharge properties. Particularly, the formation of SEI films in application fields that require high-rate characteristics, such as EVs, leads to an increase in resistance upon lithium intercalation/deintercalation, and as a result, the high-rate characteristics of carbonaceous anode active materials are deteriorated. Furthermore, during charge/discharge at high rates, highly reactive lithium is deposited on the surface of anodes where it reacts with electrolytes and cathode materials. This reaction may cause safety problems, such as explosion.

Thus, there is an increasing need for novel anode active materials with high performance, safety and reliability that are suitable for the fabrication of medium- and large-sized lithium secondary batteries on an industrial scale. In recent years, lithium titanium oxides (LTOs) have received attention as anode active materials for medium- and large-sized secondary batteries because of their high performance, safety and reliability.

Since LTOs have an oxidation/reduction potential by 1.5 V higher than the potential of Li/Li$^+$, there is little possibility that electrolyte solutions may be decomposed, which greatly decreases the possibility of SEI film formation that has been considered a problem in carbonaceous anode active materials. In addition, the high oxidation/reduction potential of LTOs reduces the possibility of deposition of metal lithium that has been considered a problem during high-rate charging/discharging of carbonaceous anode active materials, ensuring high stability during charge/discharge and enabling the utilization of LTOs in power sources of PHEVs, EVs, motor-driven tools and UPSs. In addition, the theoretical density of LTOs is about 3.5 g/cm$^3$ and is much higher than that of carbonaceous anode active materials. Under these circumstances, LTOs are attracting a lot of attention as promising novel anode active materials of large size secondary batteries, for example, in EVs due to their high stability, excellent charge/discharge properties at high rate and high reliability.

However, the use of LTOs with a particle size at a micron level (10-100 μm; the Brunauer-Emmett-Teller (BET) specific surface area 2-5 m$^2$/g) greatly retards the intercalation/deintercalation rate of lithium ions during charge/discharge because of their very low electrical conductivity (~10$^{-13}$ S cm$^{-1}$) and very low lithium ionic conductivity. As a result, coarse LTO particles have a low charge/discharge capacity corresponding to about 70% of its theoretical charge/discharge capacity. These problems still impede the widespread utilization of LTOs as anode active materials of lithium secondary batteries.

Many approaches to increase the charge/discharge capacity of LTOs have been introduced, for example, methods for producing nano-sized LTOs to reduce the intercalation/deintercalation distance of lithium ions, methods for improving the electrical conductivity of LTOs by carbon coating or doping, and methods for producing nanostructures to increase the contact area between electrolyte solutions and electrode materials. However, the production of nano-sized particles by solid-state methods, such as ball milling, requires the consumption of high energy and additional pulverization processes, such as ball milling, for a long time, leading to poor productivity and very broad particle size distribution. On the other hand, particles produced by liquid-phase methods, such as hydrothermal methods, co-precipitation, emulsion-drying and sol-gel methods, have considerably low charge/discharge properties because of their large size and broad particle size distribution.

When nano-sized LTOs produced by ball milling are coated with carbon by solid-state methods and liquid-phase methods, their small particle size hinders uniform coating of the carbon on the surface of the particles, leading to poor charge/discharge properties.

SUMMARY OF THE INVENTION

It is an object of the present invention to provide a method for producing lithium titanium oxide-based anode active material nanoparticles uniformly coated with carbon that allow rapid transfer of lithium ions and have high electrical conductivity and ionic conductivity leading to excellent electrochemical properties.

It is a further object of the present invention to provide carbon-coated lithium titanium oxide-based anode active material nanoparticles produced by the method.

It is another object of the present invention to provide an electrode including the lithium titanium oxide-based anode active material nanoparticles.

It is still another object of the present invention to provide a secondary battery including the electrode.

According to an aspect of the present invention, there is provided a method for coating carbon on lithium titanium oxide-based anode active material nanoparticles, the method including (a) introducing a lithium precursor solution, a titanium precursor solution and a surface modifier solution into a reactor, and reacting the solutions under supercritical fluid conditions to prepare a solution including nanoparticles of an anode active material represented by $Li_4Ti_5O_{12}$, (b) separating the anode active material nanoparticles from the solution prepared in (a), and (c) calcining the anode active material nanoparticles to coat the surface of the nanoparticles with carbon.

In step (a), the lithium precursor solution, the titanium precursor solution and the surface modifier solution may use alcohols as solvents and may be allowed to react under supercritical alcohol conditions; and the alcohols are independently selected from the group consisting of methanol, ethanol, propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethyl ethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol.

In step (a), the supercritical conditions are a temperature of at least 240° C. and a pressure of at least 40 bar.

In step (a), the concentration of a lithium precursor in the lithium precursor solution is from 0.001 to 10 mol/l, and the lithium precursor is selected from the group consisting of lithium hydroxide, lithium hydroxide monohydrate, lithium chloride, lithium acetate, lithium acetate dihydrate, lithium sulfate, lithium sulfate monohydrate, lithium phosphate, lithium nitrate, salts thereof, and mixtures thereof.

In step (a), the concentration of a titanium precursor in the titanium precursor solution is from 0.001 to 10 mol/l, and the titanium precursor is selected from the group consisting of titanium (IV) tetramethoxide, titanium (IV) tetraethoxide, titanium (IV) tetrapropoxide, titanium (IV) tetraisopropoxide, titanium (IV) tetrabutoxide, titanium (IV) tetraisobutoxide, titanium (IV) tetrapentoxide, titanium (IV) tetraisopentoxide, salts thereof, and mixtures thereof.

In step (a), the concentration of a surface modifier in the surface modifier solution is from 0.001 to 5 mol/l, and the surface modifier is selected from the group consisting of hexanoic acid, octanoic acid, decanoic acid, dodecanoic acid, tetradecanoic acid, heptadecanoic acid, octadecanoic acid, oleic acid, linoleic acid, hexylamine, octylamine, decylamine, dodecylamine, tetradecamine, oleylamine, hexaldehyde, octaldehyde, decaldehyde, dodecaldehyde, tetradecaldehyde, and mixtures thereof.

The carbon-coated anode active material nanoparticles produced in step (c) have an average particle diameter smaller than 30 nm.

According to a further aspect of the present invention, there are provided lithium titanium oxide-based anode active material nanoparticles that are produced by the carbon coating method.

According to another aspect of the present invention, there is provided an electrode including the carbon-coated lithium titanium oxide-based anode active material nanoparticles. According to yet another aspect of the present invention, there is provided a secondary battery including the electrode.

The lithium titanium oxide-based anode active material of the present invention has a nanometer size and a uniform particle size distribution and allows rapid transfer of lithium ions. In the lithium titanium oxide-based anode active material of the present invention, carbon is uniformly coated on the surface of the nanoparticles, achieving high electrical conductivity leading to excellent electrochemical properties, for example, high discharge capacity upon high-rate charge/discharge.

In addition, according to the present invention, the nano-sized anode active material can be produced without the need for additional pulverization and the consumption of high energy.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
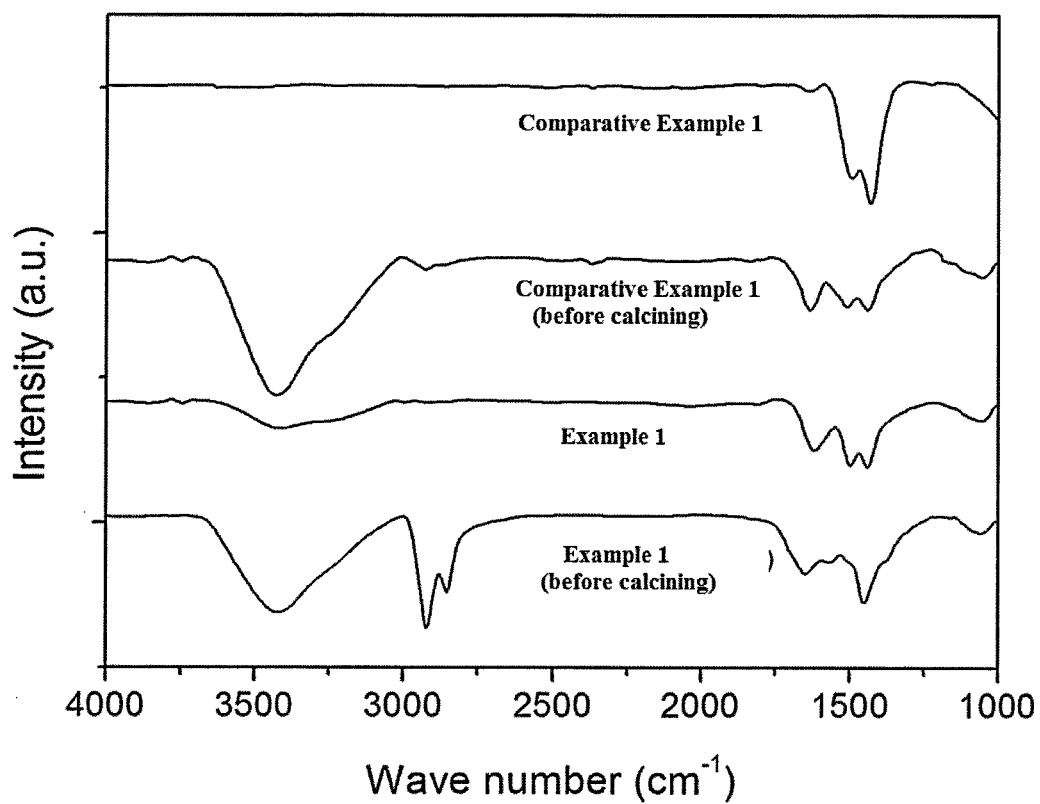
FIG. 1 shows FT-IR spectra of lithium titanium oxide-based anode active material nanoparticles produced in Example 1 and Comparative Example 1 of the present invention.

The present invention provides a method for coating carbon on lithium titanium oxide-based anode active material nanoparticles by calcining anode active material nanoparticles surface modified with an organic material to uniformly coat carbon on the nanoparticles, achieving high electrical conductivity leading to excellent electrochemical properties and allowing rapid transfer of lithium ions. The present invention also provides carbon-coated lithium titanium oxide-based anode active material nanoparticles produced by the method.

The present invention will now be described in detail.

The method of the present invention includes (a) introducing a lithium precursor solution, a titanium precursor solution and a surface modifier solution into a reactor, and reacting the solutions under supercritical fluid conditions to prepare a solution including nanoparticles of an anode active material represented by $Li_4Ti_5O_{12}$, (b) separating the anode active material nanoparticles from the solution prepared in (a), and (c) calcining the anode active material nanoparticles to coat the surface of the nanoparticles with carbon.

The lithium titanium oxide-based anode active material nanoparticles have a spinel structure and their charge/discharge reaction is as follows:

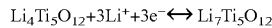

$$Li_4Ti_5O_{12} + 3Li^+ + 3e^- \leftrightarrow Li_7Ti_5O_{12}$$

$Li_4Ti_5O_{12}$ has an operating voltage of 1.3 to 1.6 V and undergoes a very small volume change (<0.1%) when its spinel structure is converted to a rock-salt structure ($Li_7Ti_5O_{12}$) upon intercalation of lithium, ensuring excellent cycle characteristics. In addition, since there is substantially no irreversible reaction, at least 90% of the initial efficiency can be maintained even after charge/discharge for a long time.

The carbon-coated lithium titanium oxide-based anode active material nanoparticles are produced by the following procedure. First, a lithium precursor solution, a titanium precursor solution and a surface modifier solution are introduced into a reactor where the solutions are allowed to react for 1 minute to 6 hours, preferably 5 minutes to 3 hours, under supercritical fluid conditions to prepare a solution including lithium titanium oxide-based anode active material nanoparticles. The surface modifier solution serves to modify the surface of the anode active material nanoparticles. This surface modification enables uniform coating of carbon on the surface of the nanoparticles in the subsequent calcination step, thereby improving the electrical conductivity of the nanoparticles and increasing the discharge capacity of the nanoparticles.

The supercritical fluid conditions are a temperature of at least 240° C., preferably 240 to 600° C. more preferably 300 to 600° C., and a pressure of at least 40 bar, preferably 40 to 600 bar, more preferably 100 to 600 bar.

If the temperature and pressure of the supercritical fluid are less than the respective lower limits, the average particle diameter of the anode active material nanoparticles may exceed 100 nm and the degree of crystallization of the anode active material nanoparticles may be lowered, resulting in low discharge capacity. Meanwhile, if the temperature and pressure of the supercritical fluid are greater than the respective upper limits, the nanoparticles may aggregate, resulting in low discharge capacity.

If the reaction time under supercritical fluid conditions is shorter than its lower limit, the degree of crystallization of the anode active material nanoparticles may not increase anymore and a large amount of impurities may remain. Meanwhile, if the reaction time is longer than the upper limit, the nanoparticles may aggregate into larger sizes with poor productivity.

Preferably, the solutions use alcohols as solvents and are allowed to react in a supercritical fluid, for example, a supercritical alcohol. Specifically, the alcohols may be independently selected from the group consisting of methanol (critical temperature=239° C.; critical pressure=81 bar), ethanol (critical temperature=241° C.; critical pressure=63 bar), propanol (critical temperature=264° C.; critical pressure=52 bar), isopropyl alcohol (critical temperature=307° C.; critical pressure=41 bar), butanol (critical temperature=289° C.; critical pressure=45 bar), isobutanol (critical temperature=275° C.; critical pressure=45 bar), 2-butanol (critical temperature=263° C.; critical pressure=42 bar), tert-butanol (critical temperature=233° C.; critical pressure=40 bar), n-pentanol (critical temperature=307° C.; critical pressure=39 bar), isopentyl alcohol (critical temperature=306° C.; critical pressure=39 bar), 2-methyl-1-butanol (critical temperature=302° C.; critical pressure=39 bar), neopentyl alcohol (critical temperature=276° C.; critical pressure=40 bar), diethyl carbinol (critical temperature=286° C.; critical pressure=39 bar), methyl propyl carbinol (critical temperature=287° C.; critical pressure=37 bar), methyl isopropyl carbinol (critical temperature=283° C.; critical pressure=39 bar), dimethyl ethyl carbinol (critical temperature=271° C.; critical pressure=37 bar), 1-hexanol (critical temperature=337° C.; critical pressure=34 bar), 2-hexanol (critical temperature=310° C.; critical pressure=33 bar), 3-hexanol (critical temperature=309° C.; critical pressure=34 bar), 2-methyl-1-pentanol (critical temperature=331° C.; critical pressure=35 bar), 3-methyl-1-pentanol (critical temperature=387° C.; critical pressure=30 bar), 4-methyl-1-pentanol (critical temperature=330° C.; critical pressure=30 bar), 2-methyl-2-pentanol (critical temperature=286° C.; critical pressure=36 bar), 3-methyl-2-pentanol (critical temperature=333° C.; critical pressure=36 bar), 4-methyl-2-pentanol (critical temperature=301° C.; critical pressure=35 bar), 2-methyl-3-pentanol (critical temperature=303° C.; critical pressure=35 bar), 3-methyl-3-pentanol (critical temperature=302° C.; critical pressure=35 bar), 2,2-dimethyl-1-butanol (critical temperature=301° C.; critical pressure=35 bar), 2,3-dimethyl-1-butanol (critical temperature=331° C.; critical pressure=35 bar), 2,3-dimethyl-2-butanol (critical temperature=331° C.; critical pressure=35 bar), 3,3-dimethyl-1-butanol (critical temperature=331° C.; critical pressure=35 bar), 2-ethyl-1-butanol (critical temperature=307° C. critical pressure=34 bar), 1-heptanol (critical temperature=360° C.; critical pressure=31 bar), 2-heptanol (critical temperature=335° C.; critical pressure=30 bar), 3-heptanol (critical temperature=332° C.; critical pressure=30 bar), and 4-heptanol (critical temperature=329° C.; critical pressure=30 bar).

The supercritical fluid may be, for example, a supercritical alcohol. The supercritical alcohol refers to an alcohol in a state above the critical temperature and critical pressure. The use of the supercritical alcohol bearing both gas and liquid properties in the reaction allows for rapid crystal growth and enables the production of uniform nano-sized particles because the solubility of a reaction intermediate is considerably lower than that of the fluid at ambient temperature and pressure. In addition, the combination of the supercritical alcohol and the surface modifier solution allows for chemical binding of the surface modifier to the surface of growing nanoparticles. This chemical binding impedes the growth of the particles, thus facilitating the production of the nano-sized particles.

The use of solvents other than alcohol may make it impossible to produce nano-sized particles and may not allow modification of the entire surface of particles.

The lithium precursor solution refers to a solution of a lithium precursor in an alcohol. The concentration of the lithium precursor in the lithium precursor solution is from 0.001 to 10 mol/l, preferably from 0.001 to 5 mol/l. If the concentration of the lithium precursor is less than the lower limit, a small amount of the anode active material nanoparticles per unit time may be produced, which is disadvantageous in terms of economic efficiency. Meanwhile, if the concentration of the lithium precursor is greater than the upper limit, the size of the anode active material nanoparticles may be excessively large and the uniformity of the particles may be deteriorated, resulting in low discharge capacity.

The lithium precursor is not particularly limited and may be, for example, one of those known in the art. Preferably, the lithium precursor is selected from the group consisting of lithium hydroxide (LiOH), lithium hydroxide monohydrate ($LiOH.H_2O$), lithium chloride (LiCl), lithium acetate ($LiCH_3OO$), lithium acetate dihydrate ($LiCH_3OO.2H_2O$), lithium sulfate ($Li_2SO_4$), lithium sulfate monohydrate ($Li_2SO_4.H_2O$), lithium phosphate ($Li_3PO_4$), lithium nitrate ($LiNO_3$), salts thereof, and mixtures thereof.

The titanium precursor solution refers to a solution of a titanium precursor in an alcohol. The concentration of the titanium precursor in the titanium precursor solution is from 0.001 to 10 mol/l, preferably from 0.01 to 5 mol/l. If the concentration of the titanium precursor is less than the lower limit, a small amount of the anode active material nanoparticles per unit time may be produced, which is disadvantageous in terms of economic efficiency. Meanwhile, if the concentration of the titanium precursor is greater than the upper limit, the size of the anode active material nanoparticles may be excessively large and the uniformity of the particles may be deteriorated, resulting in low discharge capacity.

The titanium precursor is not particularly limited and may be, for example, one of those known in the art. Preferably, the titanium precursor is selected from the group consisting of titanium (IV) tetramethoxide ($Ti(OCH_3)_4$), titanium (IV) tetraethoxide ($Ti(OCH_2CH_3)_4$), titanium (IV) tetra-n-propoxide ($Ti(OCH_2CH_2CH_3)_4$), titanium (IV) tetra-iso-propoxide ($Ti[OCH(CH_3)_2]_4$), titanium (IV) tetra-n-butoxide ($Ti(OCH_2CH_2CH_2CH_3)_4$), titanium (IV) tetra-iso-butoxide ($Ti[OCHCH_2(CH_3)_2]_4$), titanium (IV) tetra-n-pentoxide ($Ti(OCH_2CH_2CH_2CH_2CH_3)_4$), titanium (IV) tetra-iso-pentoxide ($Ti[OCHCH_2CH_2(CH_3)_2]_4$), salts thereof, and mixtures thereof.

The surface modifier solution serves to facilitate the production of the nano-sized particles and modifies the surface of the nanoparticles. This surface modification allows for uniform coating of carbon. The surface modifier solution refers to a solution of a surface modifier in an alcohol. The concentration of the surface modifier in the surface modifier solution is preferably from 0.001 to 5 mol/l, more preferably from 0.01 to 1 mol/l, but is not particularly limited to this range. A concentration of the surface modifier less than the lower limit is not sufficient to modify the surface of the nanoparticles, and as a result, uniform carbon coating may not be accomplished. Meanwhile, a concentration of the surface modifier exceeding the upper limit may make the solution viscous, and as a result, inhomogeneous surface modification may result, leading to poor quality of the surface-modified nanoparticles.

The surface modifier is not particularly limited so long as it is dissoluble in an alcohol and can react with hydroxyl groups present on the surface of the nanoparticles. The surface modifier is preferably a carboxylic acid, an aldehyde, an amine, etc. More preferably, the surface modifier is selected from the group consisting of hexanoic acid ($CH_3(CH_2)_4COOH$), octanoic acid ($CH_3(CH_2)_6COOH$), decanoic acid ($CH_3(CH_2)_8COOH$), dodecanoic acid ($CH_3(CH_2)_{10}COOH$), tetradecanoic acid ($CH_3(CH_2)_{12}COOH$), heptadecanoic acid ($CH_3(CH_2)_{14}COOH$), octadecanoic acid ($CH_3(CH_2)_{16}COOH$), oleic acid ($CH_3(CH_2)_7CH=CH(CH_2)_7COOH$), linoleic acid ($CH_3(CH_2)_4CH=CHCH_2CH=CH(CH_2)_7COOH$), hexylamine ($CH_3(CH_2)_5NH_2$), octylamine ($CH_3(CH_2)_7NH_2$), decylamine ($CH_3(CH_2)_9NH_2$), dodecylamine ($CH_3(CH_2)_{11}NH_2$), tetradecamine ($CH_3(CH_2)_{13}NH_2$), oleylamine ($CH_3(CH_2)_7CH=CH(CH_2)_8NH_2$)), hexaldehyde ($CH_3(CH_2)_4CHO$), octaldehyde ($CH_3(CH_2)_6CHO$), decaldehyde ($CH_3(CH_2)_8CHO$), dodecaldehyde ($CH_3(CH_2)_{10}CHO$), tetradecaldehyde ($CH_3(CH_2)_{12}CHO$), and mixtures thereof.

Next, the anode active material nanoparticles are separated from the reaction solution. Any method for separating the anode active material nanoparticles from the solvent and unreacted precursor solutions may be used without particular limitation. Centrifugation or filtration is preferred when taking into account the recovery of the anode active material nanoparticles.

The separated anode active material nanoparticles may be cleaned to remove remaining unreacted precursors or unreacted surface modifier, followed by drying. Any cleaning method capable of removing the remaining unreacted precursors or unreacted surface modifier may be used without particular limitation. The cleaning method is preferably water, methanol, ethanol or tetrahydrofuran. After cleaning, the anode active material nanoparticles are dried. The drying method is not particularly limited but is preferably vacuum drying, oven drying or freeze drying.

Then, the separated nanoparticles are calcined in an inert atmosphere at 500 to 1,000° C., preferably 600 to 800° C., for 10 minutes to 24 hours, preferably 50 minutes to 10 hours, to uniformly coat the modified nanoparticles with carbon. If the calcining temperature and time are less than the respective lower limits, carbon from the surface modifier may not be uniformly coated on the nanoparticles and sufficient carbonization may not proceed. Meanwhile, if the calcining temperature and time exceed the respective upper limits, considerable cost may be needed to maintain the high temperature, leading to a rise in production cost.

The average particle diameter of the carbon-coated anode active material nanoparticles is smaller than 30 nm, preferably from 5 to less than 30 nm. If the average particle diameter exceeds the upper limit, the discharge capacity may be lowered.

The lithium titanium oxide-based anode active material nanoparticles can be, used in an electrode including an anode active material, a conductive material, a binder and an electrolyte. The lithium titanium oxide nanoparticles are used as constituents of the anode active material. The electrode can be used in a secondary battery including electrodes, an electrolyte and a separator. The electrode is used as an anode of the secondary battery.

The following examples are provided to assist in a further understanding of the invention but are intended for illustrative purposes only. Therefore, it will be evident to those skilled in the art that various modifications and variations can be made without departing from the scope and spirit of the invention and such modifications and variations are encompassed within the scope of the appended claims.

EXAMPLES

Example 1

Methanol was placed in a container and lithium hydroxide was added in such an amount that the concentration reached 0.08 mol/l. Methanol was placed in another container and titanium (IV) tetraisopropoxide was added in such an amount that the concentration reached 0.1 mol/l. Methanol was placed in another container and oleylamine as a surface modifier was added in such an amount that the concentration reached 0.08 mol/l. The lithium hydroxide solution, the titanium tetraisopropoxide solution and the oleylamine solution were mixed. 4 ml of the mixed solution was fed into an autoclave. The autoclave was introduced into a salt bath whose temperature was maintained at 400° C. The mixed solution was allowed to react with shaking at a pressure of 300 bar for 15 min while maintaining the temperature of the autoclave at 400° C. After completion of the reaction, the reaction solution was filtered to separate nanoparticles ($Li_4Ti_5O_{12}$). The nanoparticles were collected, washed with ultrapure water, and dried in a vacuum oven at 60° C. for 24 hr. The dried nanoparticles were calcined at 750° C. for 6 hr to coat carbon on the surface thereof, affording carbon-coated lithium titanium oxide-based anode active material nanoparticles.

Example 2

Lithium titanium oxide-based anode active material nanoparticles were produced in the same manner as in Example 1, except that propanol was used as a solvent instead of methanol.

Example 3

Lithium titanium oxide-based anode active material nanoparticles were produced in the same manner as in Example 1, except that diethyl ether was used as a solvent instead of methanol.

Example 4

Lithium titanium oxide-based anode active material nanoparticles were produced in the same manner as in Example 1, except that hexaldehyde was used instead of oleylamine.

Example 5

Lithium titanium oxide-based anode active material nanoparticles were produced in the same manner as in Example 1, except that decanoic acid was used instead of oleylamine.

Example 6

Lithium titanium oxide-based anode active material nanoparticles were produced in the same manner as in Example 1, except that the concentrations of the lithium hydroxide, titanium (IV) tetraisopropoxide and oleylamine were changed to 6 mol/l, 6 mol/l and 3 mol/l, respectively.

Comparative Example 1

Lithium titanium oxide-based anode active material nanoparticles were produced in the same manner as in Example 1, except that oleylamine was not used.

Comparative Example 2

Lithium titanium oxide-based anode active material nanoparticles were produced in the same manner as in Example 1, except that the reactor was set to a pressure of 10 bar while maintaining the temperature at 100° C.

Comparative Example 3

Lithium titanium oxide-based anode active material nanoparticles were produced in the same manner as in Example 1, except that calcination was not performed.

Comparative Example 4

Lithium titanium oxide-based anode active material nanoparticles were produced in the same manner as in Comparative Example 1, except that calcination was not performed.

Test Example 1

Characterization of the Anode Active Material Nanoparticles

The characteristics of the lithium titanium oxide-based anode active material nanoparticles produced in Example 1 and Comparative Example 1 were analyzed.

1-1. FT-IR Analysis of the Anode Active Material Nanoparticles

The surface modification of the anode active material nanoparticles produced in Example 1 and Comparative Example 1 was confirmed using a Fourier transform infrared spectrometer (Thermo Electron). FIG. 1 shows FT-IR spectra of the lithium titanium oxide nanoparticles.

The nanoparticles before and after calcination in Example 1 and Comparative Example 1 were used as samples.

As shown in FIG. 1, —$CH_2$— groups (2850 $cm^{-1}$), —$CH_3$ groups (2920 $cm^{-1}$) and —OH groups (3000-3750 $cm^{-1}$) were detected on the surface of the nanoparticles of Example 1 before calcining, whereas only —OH groups (3000–3750 $cm^{-1}$) were detected on the surface of the nanoparticles of Comparative Example 1 before calcining. These results demonstrate that the use of oleylamine contributes to effective surface modification of the nanoparticles. On the other hand, the peaks corresponding to —$CH_2$—, —$CH_3$ and —OH groups disappeared from the surfaces of the nanoparticles of Example 1 and Comparative Example 1 after calcination. These results demonstrate that the high-temperature calcination removes the functional groups from the surfaces of the nanoparticles.

1-2. TEM Measurements of the Anode Active Material Nanoparticles

Figure 2:
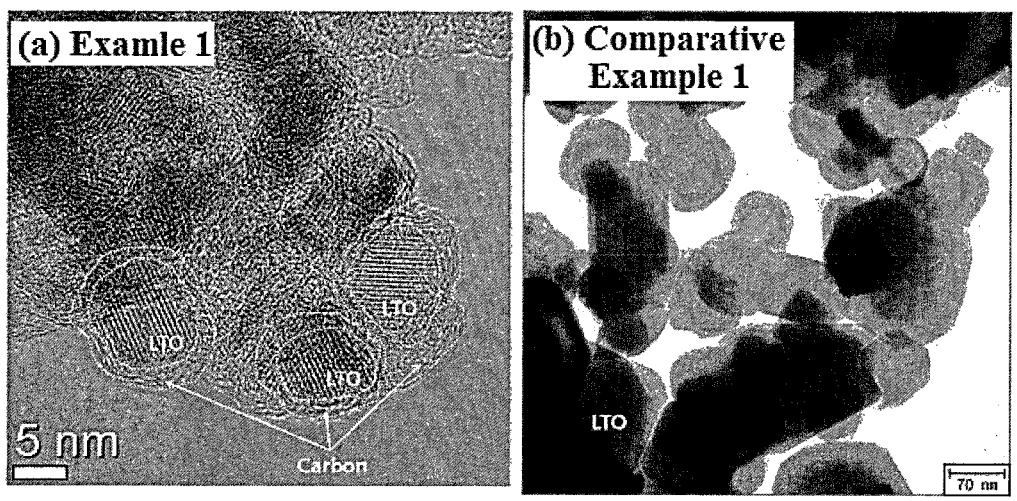
FIG. 2 shows TEM images of lithium titanium oxide-based anode active material nanoparticles produced in Example 1 and Comparative Example 1 of the present invention.

The shapes of the lithium titanium oxide-based anode active material nanoparticles produced in Example 1 and Comparative Example 1 were analyzed by transmission electron microscopy (TEM, EFI). FIG. 2 shows TEM images of the anode active material nanoparticles.

As shown in FIG. 2, the anode active material nanoparticles of Example 1 had an average particle diameter of 10 nm and were uniform without substantial aggregation. Carbon was uniformly coated on the surface of the nanoparticles of Example 1. In contrast, the anode active material nanoparticles of Comparative Example 1 had a very large average particle diameter of 100 nm or more with severe aggregation.

1-3. XRD Measurements of the Anode Active Material Nanoparticles

Figure 3:
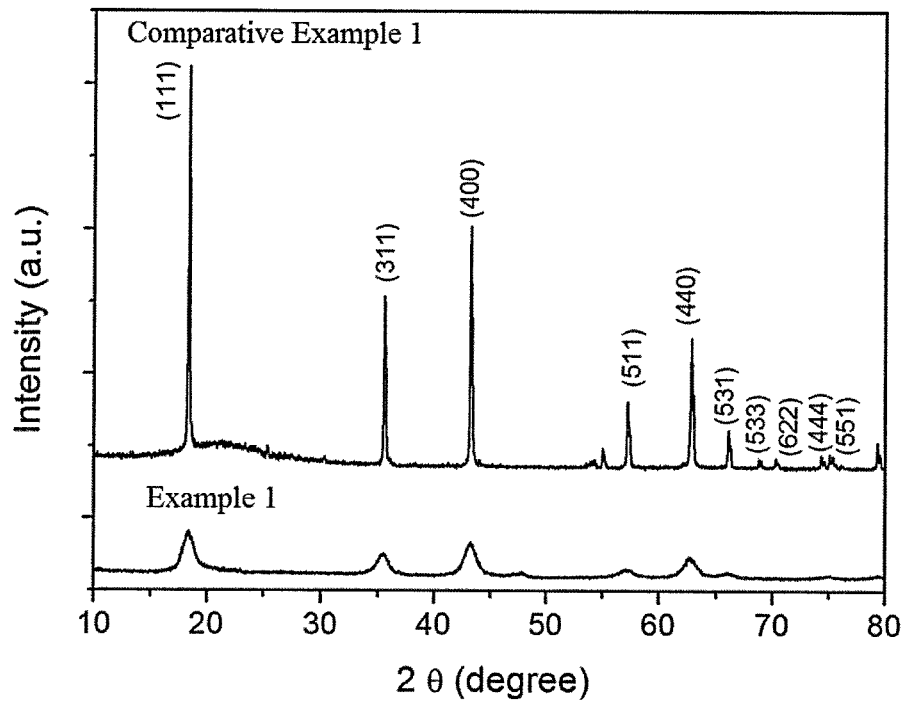
FIG. 3 shows XRD patterns of lithium titanium oxide-based anode active material nanoparticles produced in Example 1 and Comparative Example 1 of the present invention.

The elements of the lithium titanium oxide-based anode active material nanoparticles produced in Example 1 and Comparative Example 1 were analyzed using an X-ray diffractormeter (Rigaku). FIG. 3 shows XRD patterns of the anode active material nanoparticles.

As shown in FIG. 3, the anode active material nanoparticles of Example 1 and Comparative Example 1 showed effective peaks at $2\theta$ angles of 18°, 31°, 43° and 63°. No impurities were present in the anode active material nanoparticles of Example 1 and the intensity of the XRD pattern was very weak, indicating the presence of the nanoparticles in the form of small crystals. In contrast, the anode active material nanoparticles of Comparative Example 1 showed a very strong intensity of the XRD pattern, indicating the presence of the nanoparticles in the form of large crystals. Particularly, the pattern intensity of Example 1 was by 50-80% lower than that of Comparative Example 1, indicating that the crystal size of the nanoparticles of Example 1 was considerably small compared to that of the nanoparticles of Comparative Example 1.

1-4. TGA Measurements of the Anode Active Material Nanoparticles

Figure 4:
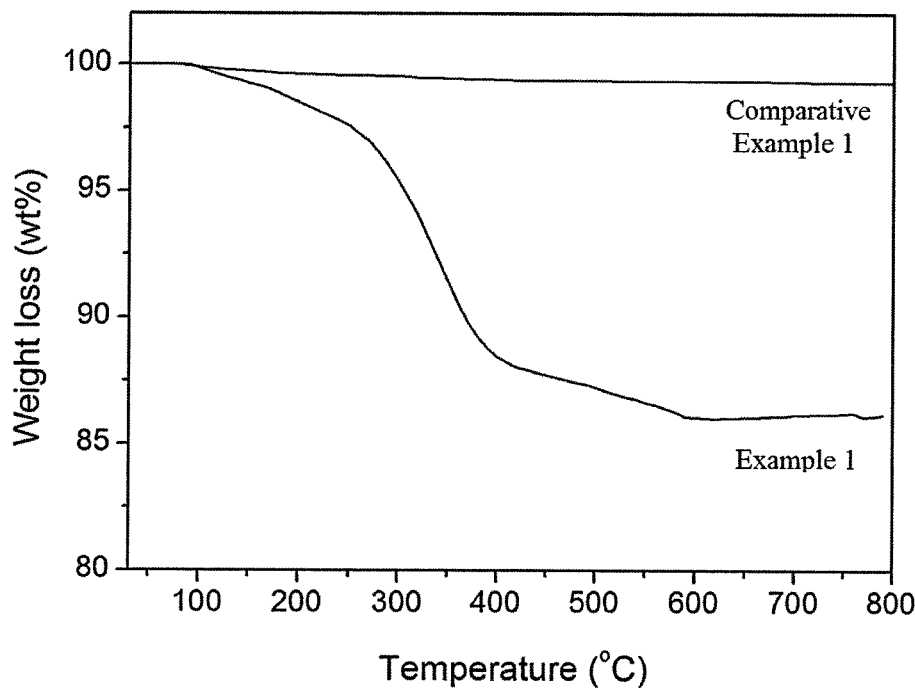
FIG. 4 shows TGA curves of lithium titanium oxide-based anode active material nanoparticles produced in Example 1 and Comparative Example 1 of the present invention.

The surface modification of the lithium titanium oxide-based anode active material nanoparticles produced in Example 1 and Comparative Example 1 was confirmed by thermogravimetric analysis (TGA, DuPont). FIG. 4 shows TGA curves of the anode active material nanoparticles.

As shown in FIG. 4, after heating the anode active material nanoparticles of Example 1 to 800° C. in air, a weight loss of about 87% was observed, indicating that the amount of carbon was about 13%. In contrast, no weight loss was observed in the anode active material nanoparticles of Comparative Example 1 with increasing temperature, indicating the absence of carbon on the surface of the nanoparticles.

1-5. Raman Spectroscopy Measurements of the Anode Active Material Nanoparticles

Figure 5:
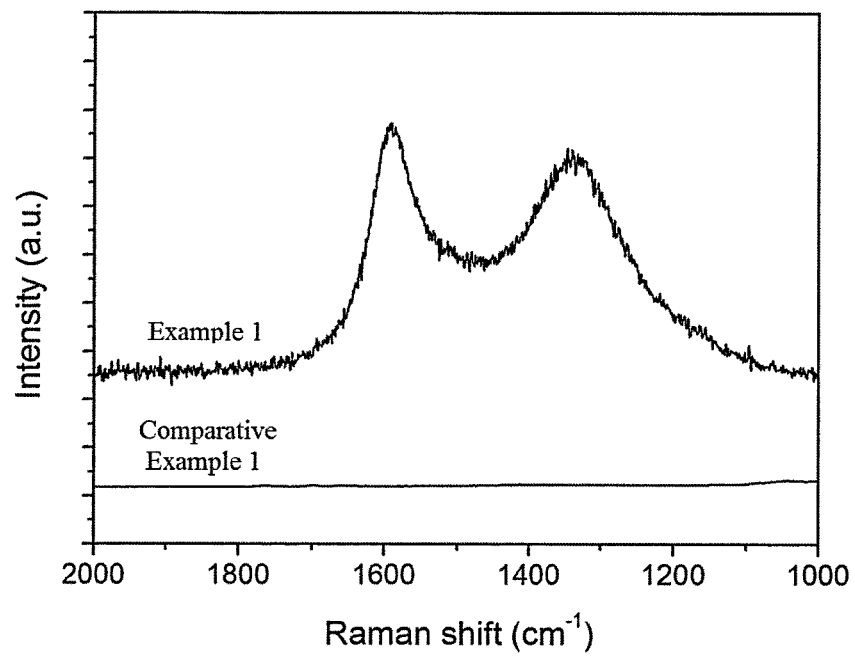
FIG. 5 shows Raman spectra of lithium titanium oxide-based anode active material nanoparticles produced in Example 1 and Comparative Example 1 of the present invention.

The carbon-coated lithium titanium oxide-based anode active material nanoparticles of Example 1 and Comparative Example 1 were analyzed by Raman spectroscopy (Thermo Fisher Scientific). FIG. 5 shows Raman spectra of the carbon-coated anode active material nanoparticles.

As shown in FIG. 5, a band corresponding to graphite carbon and a band corresponding to amorphous carbon were detected at about 1592 cm$^{-1}$ and about 1338 cm$^{-1}$, respectively, in the anode active material nanoparticles of Example 1, demonstrating the formation of carbon on the surface of the nanoparticles. In contrast, no bands corresponding to carbon were detected in the anode active material nanoparticles of Comparative Example 1, demonstrating the absence of carbon on the surface of the nanoparticles.

Test Example 2

Discharge Capacity Measurements of Cells

In this example, the electrochemical properties of each of the lithium titanium oxide-based anode active material nanoparticles produced in Examples 1-6 and Comparative Examples 1-4 were analyzed. First, the anode active material, acetylene black as a conductive material and polyvinylidene fluoride (PVDF) as a binder were mixed in a weight ratio of 87:10:3 in n-methyl pyrrolidone as a solvent to prepare a slurry. The slurry was applied onto an aluminum foil to form a 250 μm thick electrode plate, and dried in an oven at 80° C. for at least 6 hr to produce an anode. A mixture of ethylene carbonate (EC), ethyl methyl carbonate (EMC) and diethyl carbonate (DEC) in a weight ratio of 1:1:1 was used as an electrolyte solution. Li metal and a solution of lithium hexafluorophosphate (LiPF$_6$) were used to produce a cathode. The anode, the electrolyte solution and the cathode were assembled to fabricate a coin-type half cell. The charge/discharge properties and cyclability of the cell were investigated at a voltage of 1.0-2.5 V and 0.1-50 C with varying charging/discharging rates. The results are shown in Table 1.

TABLE 1

| Example No. | Initial discharge capacity at 0.1 C (mAh/g) | Discharge capacity at 50 C (mAh/g) | Discharge capacity at 0.1 C after 110 cycles (mAh/g) |
| --- | --- | --- | --- |
| Example 1 | 174 | 101 | 172 |
| Example 2 | 171 | 100 | 160 |
| Example 3 | 126 | 71 | 112 |
| Example 4 | 171 | 100 | 169 |
| Example 5 | 173 | 98 | 171 |
| Example 6 | 159 | 34 | 151 |
| Comparative Example 1 | 159 | 24 | 155 |
| Comparative Example 2 | 125 | 12 | 110 |
| Comparative Example 3 | 115 | 2 | 93 |
| Comparative Example 4 | 120 | 5 | 60 |

As can be seen from the results in Table 1, the cells using the anode active material nanoparticles produced in Examples 1, 2, 4 and 5 had much higher initial discharge capacities at 0.1 C, discharge capacities at 50 C and discharge capacities after 100 cycles than the cells using the anode active material nanoparticles produced in Comparative Examples 1-4.

Figure 6:
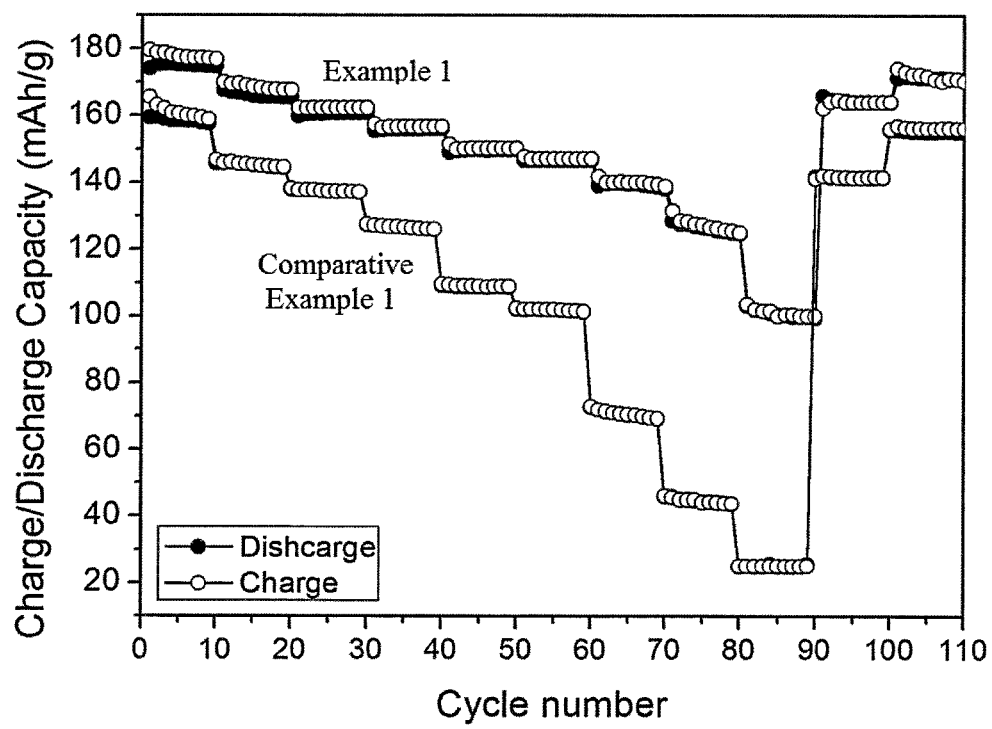
FIG. 6 shows charge/discharge properties and high-rate characteristics of cells using lithium titanium oxide-based anode active material nanoparticles produced in Example 1 and Comparative Example 1 of the present invention.

FIG. 6 shows charge/discharge properties and high-rate characteristics of the cells using the nanoparticles of Example 1 and Comparative Example 1. As shown in FIG. 6, the charge/discharge properties and high-rate characteristics of the cell using the nanoparticles of Example 1 were much better than those of the cell using the nanoparticles of Comparative Example 1. These results seem to be because the larger size of the nanoparticles of Comparative Example 1 than the nanoparticles of Example 1 causes a low intercalation/deintercalation rate of lithium ions during charge/discharge and the absence of a conductive material on the surface of the nanoparticles of Comparative Example 1 causes a low electrical conductivity.

The anode active material of Example 3, which uses diethyl ether instead of alcohol as a solvent, had an average particle size of 1000 nm or more and was not uniformly coated with carbon, which account for its low discharge capacity.

The nanoparticles of Comparative Example 1, whose surface was unmodified, were not coated with carbon, and the nanoparticles of Comparative Examples 3 and 4, which had undergone no calcination, were not uniformly coated with carbon, which account for their low discharge capacities. The anode active material of Comparative Example 2, which was synthesized under non-supercritical fluid conditions, had an average particle size of 2,000 nm or more, which accounts for its low discharge capacity.

What is claimed is:

1. A method for carbon coating on lithium titanium oxide-based anode active material nanoparticles, the method comprising
   (a) introducing together a lithium precursor solution, a titanium precursor solution and a surface modifier solution into a reactor, and reacting the introduced together solutions under supercritical fluid conditions to prepare a solution comprising nanoparticles of an anode active material represented by $Li_4Ti_5O_{12}$, wherein the surface modifier solution comprises a surface modifier having a concentration between 0.001 mol/L to 5 mol/L in which the surface modifier comprises at least any one of a carboxylic acid, an aldehyde, and an amine, wherein the introduced together solutions comprise an alcohol,
   (b) separating the anode active material nanoparticles from the prepared solution in (a), and
   (c) calcining the anode active material nanoparticles to coat the surface of the nanoparticles with carbon wherein the carbon-coated anode active material nanoparticles have an average diameter between 5 nm to less than 30 nm.

2. The method according to claim 1, wherein in step (a), the lithium precursor solution, the titanium precursor solution and the surface modifier solution uses the alcohol as a solvent and the introduced together solutions are allowed to react under supercritical alcohol conditions.

3. The method according to claim 1, wherein in step (a), the supercritical conditions are a temperature of at least 240° C. and a pressure of at least 40 bar.

4. The method according to claim 2, wherein the alcohol is independently selected from the group consisting of methanol, ethanol, propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethylethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol.

5. The method according to claim 1, wherein in step (a), the concentration of a lithium precursor in the lithium precursor solution is from 0.001 to 10 mol/l.

6. The method according to claim 5, wherein the lithium precursor is selected from the group consisting of lithium hydroxide, lithium hydroxide monohydrate, lithium chloride, lithium acetate, lithium acetate dihydrate, lithium sulfate, lithium sulfate monohydrate, lithium phosphate, lithium nitrate, salts thereof, and mixtures thereof.

7. The method according to claim 1, wherein in step (a), the concentration of a titanium precursor in the titanium precursor solution is from 0.001 to 10 mol/l.

8. The method according to claim 7, wherein the titanium precursor is selected from the group consisting of titanium (IV) tetramethoxide, titanium (IV) tetraethoxide, titanium (IV) tetrapropoxide, titanium (IV) tetraisopropoxide, titanium (IV) tetrabutoxide, titanium (IV) tetraisobutoxide, titanium (IV) tetrapentoxide, titanium (IV) tetraisopentoxide, salts thereof, and mixtures thereof.

9. The method according to claim 1, wherein in step (a), the surface modifier further comprises being selected from the group consisting of hexanal, octanal, decanal, dodecanal, tetradecanal, and mixtures thereof, and the concentration of the surface modifier in the surface modifier solution is from 0.001 to 5 mol/l.

10. The method according to claim 1, wherein the surface modifier is selected from the group consisting of hexanoic acid, octanoic acid, decanoic acid, dodecanoic acid, tetradecanoic acid, heptadecanoic acid, octadecanoic acid, oleic acid, linoleic acid, hexylamine, octylamine, decylamine, dodecylamine, tetradecamine, oleylamine, hexanal, octanal, decanal, dodecanal, tetradecanal, and mixtures thereof.

11. Lithium titanium oxide-based anode active material nanoparticles produced by the method according to claim 1.

12. An electrode comprising the carbon-coated lithium titanium oxide-based anode active material nanoparticles according to claim 11.

13. A secondary battery comprising the electrode according to claim 12.

14. A method for forming a carbon coating on lithium titanium oxide-based anode active material nanoparticles, the method comprising the steps of:
   (a) providing a solution comprising a lithium precursor, a titanium precursor, a surface modifier and a solvent, wherein the surface modifier comprises at least any one of a carboxylic acid, an aldehyde, and an amine, and the surface modifier is at a concentration of between 0.001 mol/L to 5 mol/L, wherein the solvent comprises an alcohol or a plurality of alcohols,
   (b) feeding the provided solution into a reactor, and reacting the provided solution under supercritical fluid conditions to form a reacted solution comprising nanoparticles of an anode active material represented by $Li_4Ti_5O_{12}$,
   (c) separating the anode active material nanoparticles from the reacted solution prepared in (b), and
   (d) calcining the anode active material nanoparticles to coat the surface of the nanoparticles with carbon whereby to form the carbon coating anode active material nanoparticles that have an average diameter between 5 nm to less than 30 nm,
   wherein the surface modifier is dissolvable in the solvent and reacts with hydroxyl groups on a surface of the nanoparticles to form —CH2- and CH3- groups on the surface of the nanoparticles in the reacting in step (b), the surface modifier being present in the solution in step (a) in an amount effective for causing the carbon to coat the surface of the nanoparticles more uniformly and with less aggregation of the nanoparticles than if the surface modifier were omitted from the solution in step (a).

15. The method according to claim 14, wherein the surface modifier is selected from the group consisting of hexanal, octanal, decanal, dodecanal, tetradecanal, and mixtures thereof.

16. The method according to claim 14, wherein the surface modifier is selected from the group consisting of hexanoic acid, octanoic acid, decanoic acid, dodecanoic acid, tetradecanoic acid, heptadecanoic acid, octadecanoic acid, oleic acid, linoleic acid, hexylamine, octylamine, decylamine, dodecylamine, tetradecamine, oleylamine, hexanal, octanal, decanal, dodecanal, tetradecanal, and mixtures thereof.

17. The method according to claim 16, wherein the solvent is at least one independently selected from the group consisting of methanol, ethanol, propanol, isopropyl alcohol, butanol, isobutanol, 2-butanol, tert-butanol, n-pentanol, isopentyl alcohol, 2-methyl-1-butanol, neopentyl alcohol, diethyl carbinol, methyl propyl carbinol, methyl isopropyl carbinol, dimethylethyl carbinol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, 2,3-dimethyl-2-butanol, 3,3-dimethyl-1-butanol, 2-ethyl-1-butanol, 1-heptanol, 2-heptanol, 3-heptanol and 4-heptanol.

18. The method according to claim 14, wherein the nanoparticles are uniform without substantial aggregation.

19. A method for preparing carbon coated $Li_4Ti_5O_{12}$ nanoparticles, the method comprising:

mixing together an alcohol solvent, a lithium precursor, a titanium precursor, and a surface modifier into a mixed solution, wherein the surface modifier is selected from the group consisting of a carboxylic acid, an aldehyde, an amine and a combination therein and wherein the surface modifier is at a concentration range between 0.001 mol/L to 5 mol/L;

reacting the mixed solution under supercritical fluid conditions to prepare a $Li_4Ti_5O_{12}$ nanoparticle solution;

separating $Li_4Ti_5O_{12}$ nanoparticles from the $Li_4Ti_5O_{12}$ nanoparticle solution; and calcining the $Li_4Ti_5O_{12}$ nanoparticles to form the carbon coated $Li_4Ti_5O_{12}$ nanoparticles that have an average particle diameter between 5 nm to less than 30 nm.

\* \* \* \* \*